United States Patent
Epstein (10) Patent No.: US 6,631,390 B1
(45) Date of Patent: Oct. 7, 2003

(54) METHOD AND APPARATUS FOR GENERATING RANDOM NUMBERS USING FLIP-FLOP META-STABILITY

(75) Inventor: Michael A. Epstein, Spring Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/519,549

(22) Filed: Mar. 6, 2000

(51) Int. Cl.[7] ................................................ G06F 7/58
(52) U.S. Cl. ........................................ 708/250; 708/251
(58) Field of Search .......................... 708/250, 251, 708/252, 253, 254, 255, 256; 327/198, 24, 306, 156; 341/143, 131; 714/12

(56) References Cited

U.S. PATENT DOCUMENTS

| | | | |
|---|---|---|---|
| 3,790,768 A | | 2/1974 | Chevalier et al. |
| 3,855,555 A | * | 12/1974 | Burkhard et al. ............ 341/143 |
| 3,881,099 A | | 4/1975 | Ailett et al. |
| 4,395,703 A | * | 7/1983 | Piosenka .................... 708/250 |
| 4,611,183 A | * | 9/1986 | Piosenka et al. ............ 708/250 |
| 4,771,426 A | * | 9/1988 | Rattlingourd et al. ....... 370/517 |
| 4,845,654 A | | 7/1989 | Harada et al. |
| 4,912,666 A | | 3/1990 | Harada |
| 4,929,850 A | * | 5/1990 | Breuninger ................. 327/198 |
| 5,105,376 A | | 4/1992 | Pedron |
| 5,317,202 A | * | 5/1994 | Waizman .................... 327/156 |
| 5,365,122 A | | 11/1994 | Rackley |
| 5,467,464 A | * | 11/1995 | Oprescu et al. ............. 327/306 |
| 5,471,159 A | * | 11/1995 | Stuebing et al. ............ 327/24 |
| 5,570,307 A | * | 10/1996 | Takahashi ................... 708/256 |
| 5,611,021 A | | 3/1997 | Kadowaki et al. |
| 5,850,422 A | * | 12/1998 | Chen .......................... 714/12 |
| 5,963,104 A | * | 10/1999 | Buer .......................... 708/250 |
| 6,369,727 B1 | * | 4/2002 | Vincze ........................ 341/131 |
| 6,480,072 B1 | * | 11/2002 | Walsh et al. ................. 708/250 |

FOREIGN PATENT DOCUMENTS

| | | |
|---|---|---|
| EP | 0260413 A2 | 3/1988 |
| EP | 0497618 A2 | 8/1992 |
| EP | 0498534 A1 | 8/1992 |
| GB | 1299020 | 9/1970 |
| GB | 1398020 | 8/1973 |
| GB | 2291234 | 1/1996 |
| WO | WO8593604 | 2/1974 |

OTHER PUBLICATIONS

Craig S. Petrie et al., Modeling and Simulation of Oscillator–Based Random Number Generators, 1996, IEEE, p. 324–327.*

Application Note, A Metastability Primer, AN219, Philips Semiconductors, Nov. 15, 1989.

Application Note, Synchronizing and Clock Driving Solutions—Using the 74F50XXX Family, AN220, Philips Semiconductors, Sep. 1989.

* cited by examiner

Primary Examiner—Chuong Dinh Ngo
Assistant Examiner—Chat C. Do
(74) Attorney, Agent, or Firm—Edward W. Goodman (57) ABSTRACT

A random number generator is disclosed that uses the meta-stable behavior of flip-flops. The output of the flip-flop is compared to an input waveform to determine if the output signal does not match the input signal, indicating a meta-stable state. When a meta-stable event is detected an output bit is provided as a random bit. In one variation, an even random number distribution is obtained by "marking" half of the zeroes as "ones" and the other half of the zeroes as "zeroes" and half of the ones as "ones" and the other half of the ones as "zeroes." In further variations, the (i) delay between the clock and the input are varied to cause the meta-stable behavior more often and (ii) multiple circuits with n different flip-flops are utilized so that at least one of the n circuits will be meta-stable at a given time.

37 Claims, 7 Drawing Sheets

METHOD AND APPARATUS FOR GENERATING RANDOM NUMBERS USING FLIP-FLOP META-STABILITY

FIELD OF THE INVENTION

The present invention relates to random number generation, and more particularly, to a method and apparatus for generating random numbers using flip-flop meta-stability.

BACKGROUND OF THE INVENTION

Flip-flops and latches are widely used in computers and other electronic devices, for example, as sampling, counting and storage elements. A number of flip-flop types have been developed, such as D-type flip-flops ("data"), R-S latches ("reset and set"), J-K flip-flops (having J and K inputs) and T flip-flops (having only one input). A D-type flip-flop, for example, is a clocked flip-flop whose output is delayed by one clock pulse.

Figure 1A:
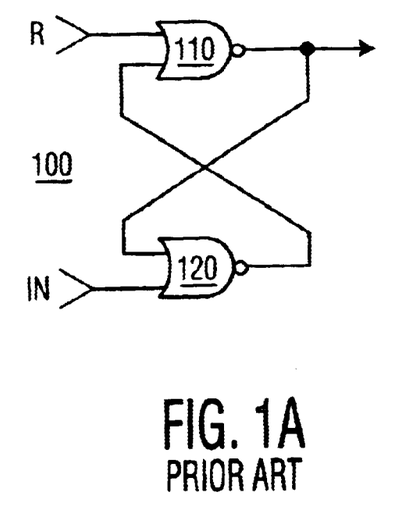
FIG. 1A illustrates a conventional R-S latch.

A conventional R-S latch 100 is shown in FIG. 1A. As in FIG. 1A, the R-S latch 100 is comprised of two NOR gates 110 and 120. The outputs of the two NOR gates 110, 120 are cross-connected to a respective input of the opposite NOR gate. Thus, NOR gate 110 receives the output of NOR gate 120 and a reset signal, R, as inputs. Likewise, NOR gate 120 receives the output of NOR gate 110 and the set signal, S, as inputs.

Figure 1B:
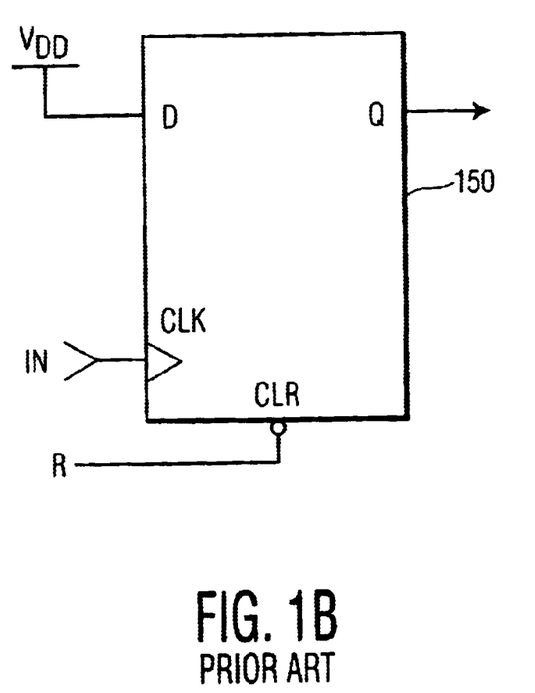
FIG. 1B illustrates a conventional D-type flip-flop.

More recently, the simple latches shown in FIG. 1A have been replaced by edge-triggered flip-flops, such as the D-type flip-flop 150 is shown in FIG. 1B. Edge-triggered flip-flops change state based on a rising or falling clock edge and a data input. A conventional D-type flip-flop 150 is shown in FIG. 1B. Such D-type flip-flops are often used to detect the logic state of an asynchronous digital signal having an unpredictable timing relative to the clock signal. A synchronous signal is applied to the clock input, CLK, of the flip-flop 150, while a digital logic level of the asynchronous signal to be detected is directed to the D input. The detected signal is then produced on the Q output line. Thereafter, the flip-flop 150 simply changes state whenever the input signal at the D input is changed (so long as the reset signal is tied permanently to ground).

It is well-known that the latches 100 shown in FIG. 1A are susceptible to meta-stability. For a detailed discussion of meta-stability, see, for example, Application Note, A Meta-Stability Primer, AN219, Philips Semiconductors (Nov. 15, 1989), incorporated by reference herein. Generally, meta-stability can occur when both inputs to a latch 100 are set at a high logic value ("11"), and are then reset to a low logic value ("00"). Under these conditions, the latch outputs can oscillate unpredictably in a statistically known manner. In theory, the latch 100 can oscillate indefinitely. In practice, however, the latch 100 will randomly shift and arrive at a random output value of either logic low or high. Typically, these meta-stable values are subsequently detected by other circuitry in a given application and can be interpreted as different logic level states.

In addition, the edge-triggered flip-flop 150 shown in FIG. 1B can become meta-stable when the setup or hold times of the flip-flop are violated. Edge-triggered flip-flops 150 are susceptible to meta-stability because inside every edge-triggered flip-flop 150 there is a latch 100 being fed by the edge detection circuitry. If the setup or hold times are violated then the internal latch 100 will observe inputs that can trigger the meta-stable state.

For most applications, especially those requiring reliable detection of the logic level state of an asynchronous signal, such meta-stable behavior is undesirable. Thus, a number of techniques have been proposed or suggested to provide flip-flops that are not susceptible to meta-stability. Philips Semiconductors of Sunnyvale, Calif., for example, provides a family of integrated circuits that exhibit meta-stable immune characteristics. See, for example, Application Note, Synchronizing and Clock Driving Solutions—Using the 74F50XXX Family, AN220, Philips Semiconductors (Sep., 1989), incorporated by reference herein. In addition, U.S. Pat. No. 5,365,122, issued to Rackley, discloses a meta-stable resistant R-S latch.

Many applications and electronic devices require random numbers, including games of chance, such as poker, roulette, and slot machines. In particular, numerous cryptographic algorithms and protocols depend on a non-predictable source of random numbers to implement secure electronic communications and the like. There are numerous devices available for generating a random number. A number of factors are important in evaluating a random number generator. For example, it is desirable that the random number generator can generate every possible permutation in the designated range of numbers. In addition, the random number generator should not be biased and should generate any given number with the same probability as any other number. Moreover, the random number generator should generate random numbers that cannot be predicted, irrespective of the size of the collection of previous results. Thus, the random numbers should be completely unpredictable and non-susceptible to outside influences. Therefore, ideal random number generators have used forces in nature, such as radioactive decay or analog noise in zener diodes, as the source of randomness. These devices are essentially perfect in that natural forces can neither be predicted nor influenced.

Many computer-generated random numbers are easily predictable, thus leading to the failure of secure systems or games of chance. Hardware-based random number generators have typically been constructed using analog devices that make integration on digital integrated circuits difficult. In addition, they have often been temperamental in terms of reacting to noise in power supplies and local electronic noise in computer systems. Thus, such generators have not been cost effective for implementation in many systems, such as smart cards or typical personal computers.

A need therefore exists for a method and apparatus for generating random numbers that can utilize only digital technology and consists of very few gates. This will allow easy integration of the random number generator into any product that could benefit from it.

SUMMARY OF THE INVENTION

Generally, a method and apparatus are disclosed for generating random numbers using the meta-stable behavior of flip-FLOPS. According to a first embodiment of the invention, a flip-flop is clocked with an input that deliberately violates the setup or hold times (or both) of the flip-flop to ensure meta-stable behavior. The meta-stable operation of the flip-flop provides a mechanism for generating random numbers.

The input to the flip-flop causes the meta-stable output of the flip-flop to be asynchronous with respect to the clock source. Thus, according to another aspect of the invention, a well-known synchronizing circuit is disclosed to synchronize the meta-stable output of the flip-flop with the clock source.

The synchronized output of the flip-flop is compared to an input waveform to determine if the output signal does not match the input signal, indicating a meta-stable state. When a meta-stable event is detected, an output bit is provided as a random bit.

According to a second embodiment of the invention, the time delay between meta-stable events can be used for the generation of a random number. While the first embodiment assumed that the meta-stable state will produce mistakes of ones or zeroes with an even distribution, a third embodiment assumes that meta-stability occurs more frequently with one binary value (either zero or one) for a given class of flip-flops. The third embodiment obtains an even random number distribution by "marking" half of the zeroes as "ones" and the other half of the zeroes as "zeroes." In addition, half of the ones are marked as "ones" and the other half are marked as "zeroes". Thus, irrespective of the ratio of mistakes made in the zero state or the one state, the distribution of random output bits will remain even.

A fourth and fifth embodiment of the invention account for process variations, such as voltage or temperature, that affect the ability of a flip-flop to become meta-stable on a regular or reliable basis. The fourth embodiment of the invention adjusts the delay between the clock and the input to cause the meta-stable behavior more often. The fifth embodiment of the invention accounts for process variations by utilizing multiple circuits with n different flip-flops so that at least one of the n circuits will be meta-stable at a given time.

A more complete understanding of the present invention, as well as further features and advantages of the present invention, will be obtained by reference to the following detailed description and drawings.

DETAILED DESCRIPTION

Figure 2A:
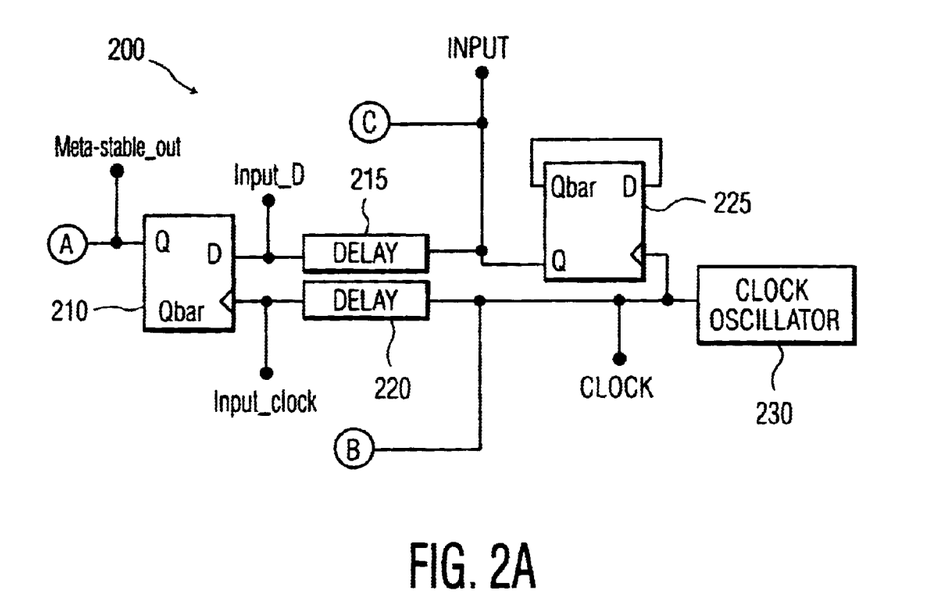
FIG. 2A illustrates a first embodiment of a random number generator in accordance with the present invention.

FIG. 2A illustrates a first embodiment of a random number generator 200 in accordance with the present invention. The present invention recognizes that the meta-stable operation of a flip-flop represents a physical means for generating random numbers. It is noted that a flip-flop or latch can be fabricated that will become meta-stable on a regular or reliable basis, for example, by changing the parameters of the flip-flop itself in combination with violating the setup or hold times for an edge-triggered flip-flop.

According to a first embodiment of the present invention, a flip-flop 210 is clocked with an input that deliberately violates the setup or hold times (or both) of the flip-flop 210 to ensure meta-stable behavior. The setup or hold times can be violated, for example, using delays 215, 220. The flip-flop 210 can be embodied, for example, as a D, T or JK type flip-flop. In addition, the flip-flop 210 could be embodied as a simple latch 100 and a slightly different circuit, as would be apparent to a person of ordinary skill in the art.

A clock source is generated by a clock oscillator 230 and a D-type flip-flop 225 whose Qbar output is fed back into its D input. In this manner, the D-type flip-flop 225 operates in the same manner as a T-type flip-flop (toggled output), to provide a divide-by-two mechanism. Thus, the D input of the flip-flop 210 is driven by alternating ones and zeroes.

Figure 2B:
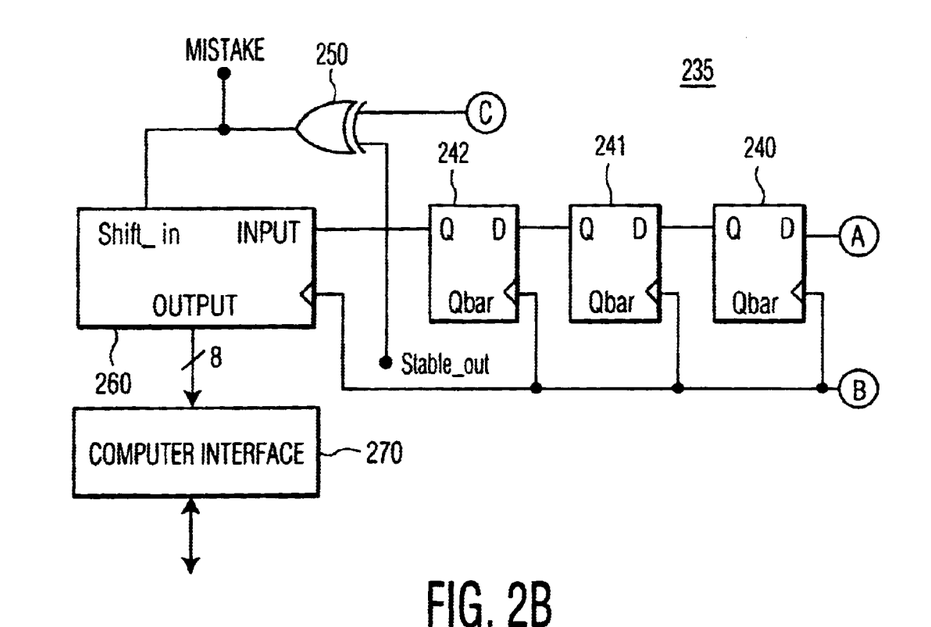
FIG. 2B illustrates a synchronizing circuit that may be utilized to synchronize the output of the random number generator of FIG. 2A with a clock source.
Figure 2C:
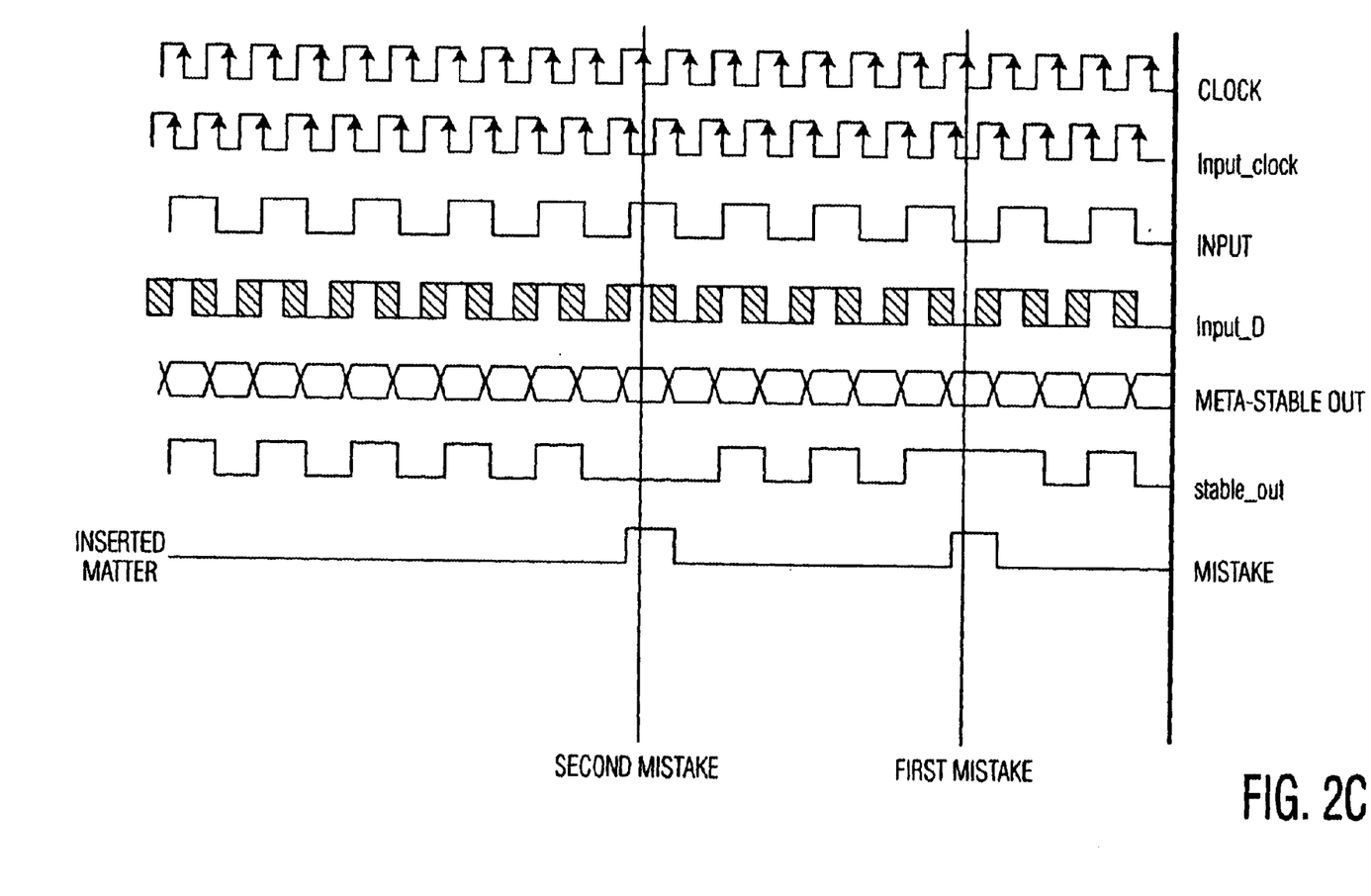
FIG. 2C illustrates a set of waveforms produced by the circuits of FIG. 2A and 2B.

As seen most clearly in FIGS. 2A and 2C, the waveform Clock produced by the clock oscillator 230 is obtained at the sample point marked "Clock" in FIG. 2A. The waveform Input produced by the divide-by-two flip-flop 225 is obtained at the sample point marked "Input" in FIG. 2A. Likewise, the waveform Input_D produced by delay 215 and the waveform Input_clock produced by delay 220 are obtained at the corresponding sample points in FIG. 2A.

As shown in FIG. 2C, the violation of the setup or hold times (or both) by the delays 215, 220 ensures that the flip-flop 210 will exhibit meta-stable behavior, as demonstrated by the waveform Meta_stable_out. As discussed further below, the meta-stable operation of the flip-flop 210 provides a mechanism for generating random numbers.

As a result of the delay from the delays 215, 220, the inherent delay in the flip-flop 210 itself, and most importantly from the non-uniform delay from the meta-stable behavior, the waveform Meta_stable_out is not synchronized to the waveform Clock. Thus, to make the random number generator 200 of FIG. 2A suitable for synchronous applications, an illustrative mechanism is provided in FIG. 2B to synchronize the waveform Meta_stable_out with the waveform Clock. It is noted that the circuitry of FIGS. 2A and 2B are connected by joining the bubbles of like letters.

The synchronizing circuitry 235 shown in FIG. 2B includes a number of serial flip-flops 240–242 that are selected so as to not enter a meta-stable state easily. In addition, if one of these flip-flops 240–242 does become meta-stable, the clock signal should be at a rate long enough that allows the output of the meta-stable flip-flop to settle, such that when the signal is sampled at the next flip-flop 240–242, the flip-flop is stable. In this manner, each flip-flop 240–242 improves the chance of synchronizing the waveform Meta_stable_out with the waveform Clock, while removing any meta-stability. Indeed, the chances of incorrect behavior for such a circuit will be measured in tens of years.

The exclusive or gate ("XOR") 250 compares the synchronized version of waveform Meta_stable_out with the waveform Input (sampled at the output of the divide-by-two flip-flop 225). Since the output of the XOR gate 250 will be high if and only if one input is high, the output of the XOR gate 250 ("Mistake") will be high if the waveform stable_out does not match the input signal. The output of the XOR gate 250 ("Mistake") is applied to the shift input of a shift register 260, and the shift register 260 will shift a bit over from the stable_out signal every time there is a Mistake. Thus, the first embodiment of the present invention collects a bit whenever there is an error (mistake).

It is noted that the first embodiment assumes that the meta-stable state will produce mistakes of ones or zeroes with an even distribution. It is again noted that if a random number generator does not produce ones and zeroes with an even distribution, the random number generator will have a bias.

Figure 3:
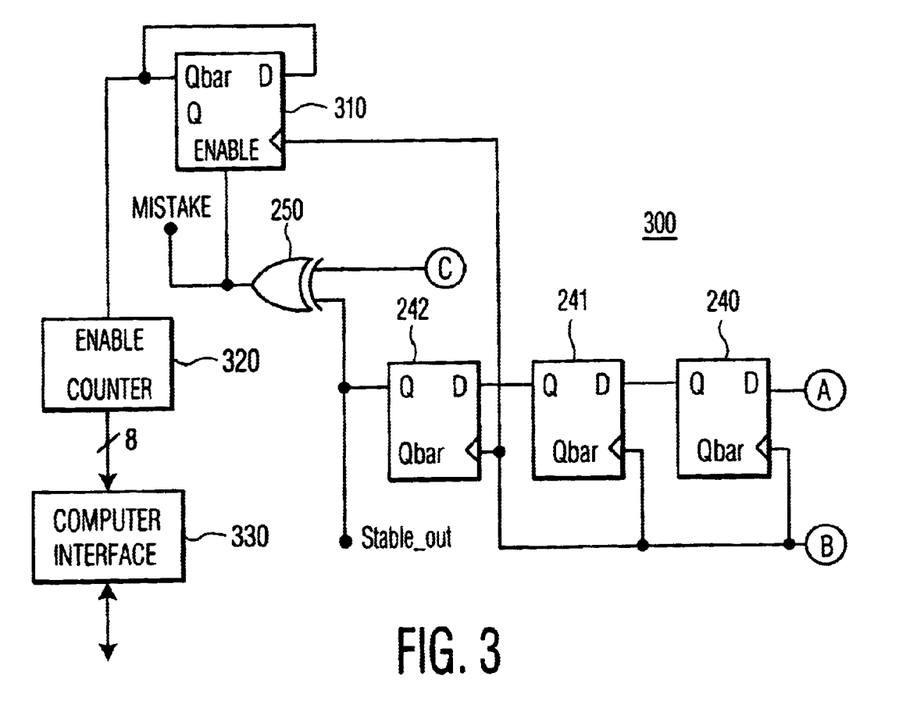
FIG. 3 illustrates a second embodiment of the present invention that utilizes the time delay between mistakes to generate a random number.

According to a second embodiment of the present invention, the time delay between mistakes can be used for the generation of a random number. FIG. 3 illustrates synchronizing circuitry 300 that includes the same serial flip-flops 240–242 and XOR gate 250 as FIG. 2B. The synchronizing circuitry 300 of FIG. 3 operates in conjunction with the random number generator 200 of FIG. 2A. The serial flip-flops 240–242 operate in the same manner as described above in conjunction with FIG. 2B to synchronize the waveform Meta_stable_out with the waveform Clock. The XOR gate 250 operates in the same manner as described above in conjunction with FIG. 2B to generate the Mistake signal.

As shown in FIG. 3, the synchronizing circuitry 300 includes a divide-by-two flip-flop 310 and a counter 320 to measure the time between mistakes. The counter 320 may be embodied, for example, as a four-bit counter. The least significant bits (LSBs) of the counter can be used to generate the random number. The counter 320 is sequentially turned on and off with each mistake. For example, for the waveforms shown in FIG. 2C, six clock cycles (binary=110) occur between mistakes zero and one. Thus, the binary counter 320 will generate a random bit of zero (LSB). More random bits can be extracted for each time interval provided a bias would not occur. Thus, we must not include bits that on average would appear more than fifty percent (50%) of the time. This would include any MSB that remains zero more than half of the time.

As previously indicated, the first embodiment assumed that the meta-stable state will produce mistakes of ones or zeroes with an even distribution. If experimental results show, however, that meta-stability occurs mostly on zeroes (or ones) for a given class of flip-flops (i.e., that mistakes are mostly obtained when the flip-flop input has a binary value of either zero or one), then an even distribution can be obtained by "marking" half of the zeroes as "ones" and the other half of the zeroes as "zeroes" and by "marking" half of the ones as "ones" and the other half of the ones as "zeroes." Thus, according to a third embodiment of the present invention, half of the zeroes in the waveform, Input, are marked as "ones" and the other half of the zeroes as "zeroes." Likewise, half of the ones in the waveform, Input, are marked as "ones" and the other half of the ones are marked as "zeroes." The illustrative embodiment assumes that mistakes are mostly obtained when the flip-flop input has a binary value of zero.

Figure 4A:
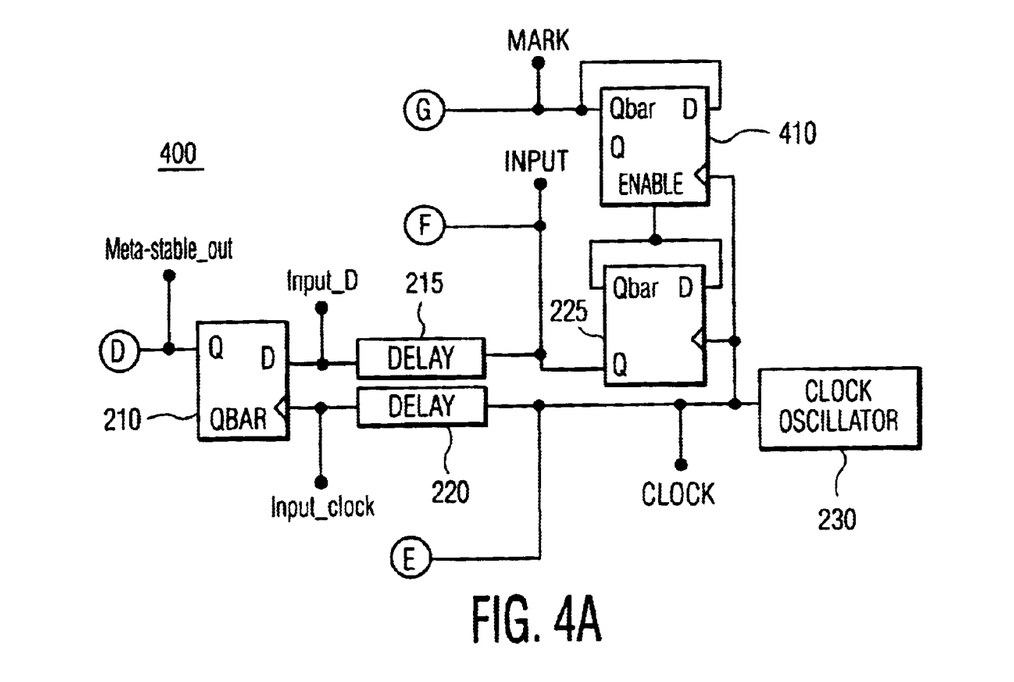
FIG. 4A illustrates a random number generator in accordance with a third embodiment of the present invention.

As shown in FIG. 4A, the random number generator 400 includes a flip-flop 210, delays 215, 220, a D-type flip-flop 225 and a clock oscillator 230 that operate in the same manner as described above in conjunction with FIG. 2A. In addition, the random number generator 400 includes a divide-by-two flip-flop 410 that generates the Mark signal, shown in FIG. 4C, that marks half of the zeroes in the waveform, Input, as "ones" and the other half of the zeroes as "zeroes."

Figure 4B:
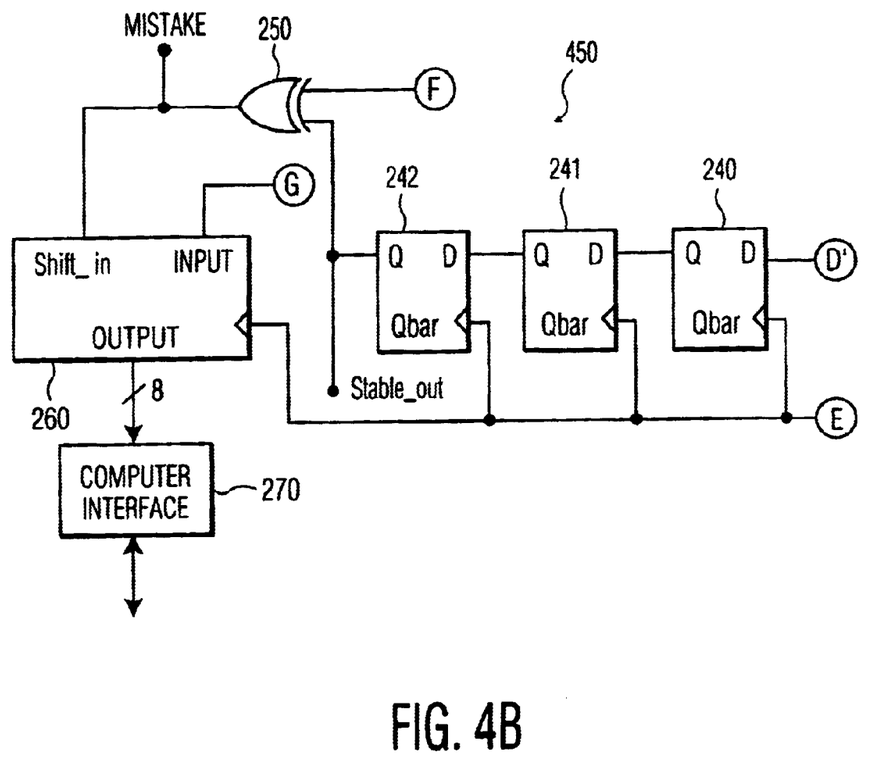
FIG. 4B illustrates a synchronizing circuit that may be utilized to synchronize the output of the random number generator of FIG. 4A with a clock source.

FIG. 4B illustrates synchronizing circuitry 450 that includes the same serial flip-flops 240–242, XOR gate 250 and shift register 260 as FIG. 2B. The synchronizing circuitry 450 of FIG. 4B operates in conjunction with the random number generator 400 of FIG. 4A. The serial flip-flops 240–242 operate in the same manner as described above in conjunction with FIG. 2B to synchronize the waveform Meta_stable_out with the waveform Clock. The XOR gate 250 operates in the same manner as described above in conjunction with FIG. 2B to generate the Mistake signal.

Figure 4C:
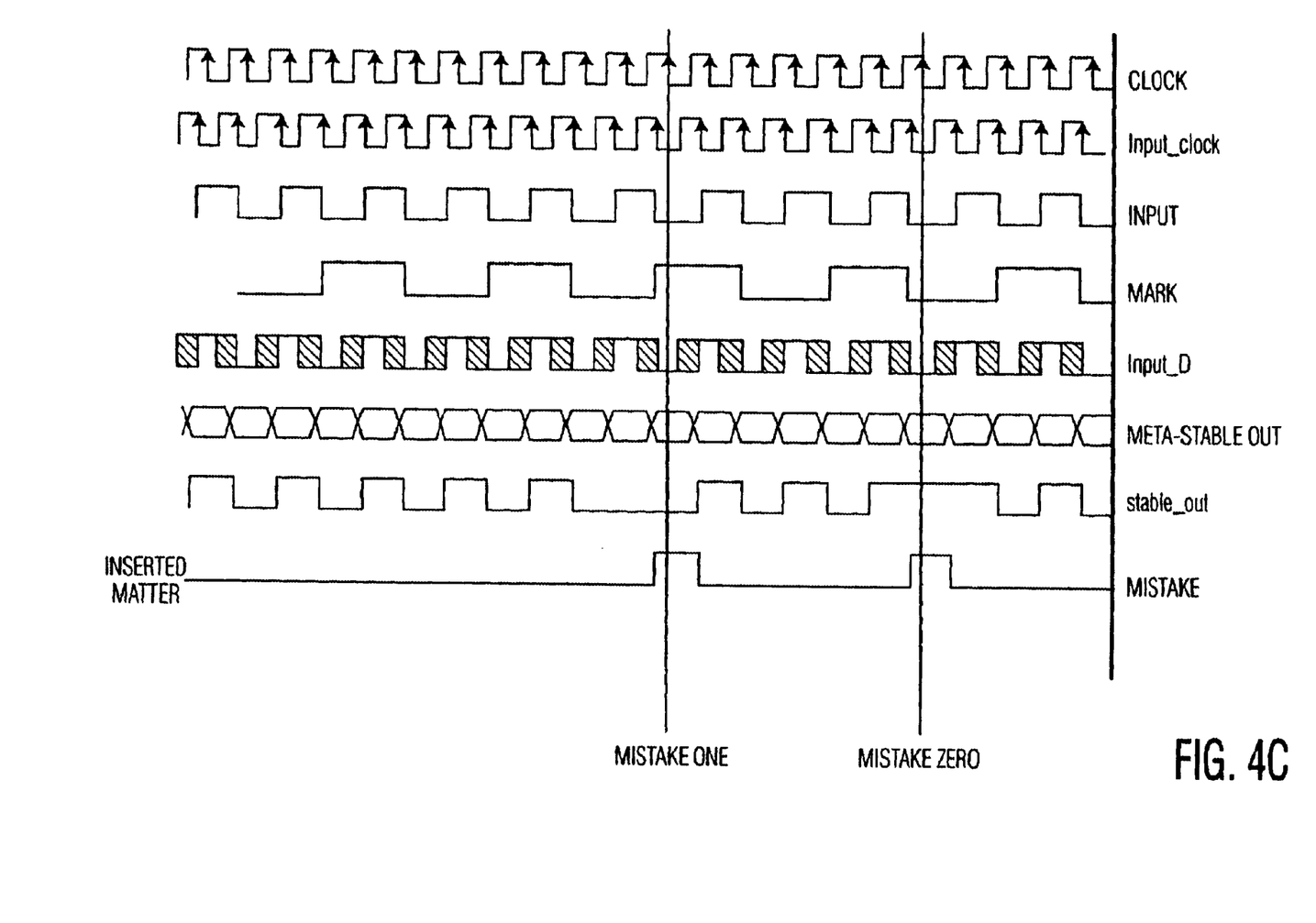
FIG. 4C illustrates a set of waveforms produced by the circuits of FIG. 4A and 4B.

The output of the XOR gate 250 ("Mistake") is applied to the shift input of a shift register 260 in the same manner as FIG. 2B. While the input line was connected to the stable_out signal in the synchronizing circuitry of FIG. 2B, the input line of the synchronizing circuitry 450 is connected to the Mark signal. In this manner, each time there is a Mistake, the shift register 260 will shift a bit from the Mark signal. Thus, as shown in FIG. 4C, for mistake zero, a bit equal to zero (based on the Mark signal) will be acquired. Similarly, for mistake one, a bit equal to one (based on the Mark signal) will be acquired.

It is again noted that the random number generator 400 also marks the ones input to flip-flop 210 with a mark of either "one" or "zero". Thus, if a mistake occurs with the one state an even distribution of random bits will also be acquired due to mistakes made with the one state. Therefore, this circuit is insensitive to the bias between errors that occur in the one or zero state.

It has been found that process variations, such as voltage or temperature, can affect the ability of a flip-flop to become meta-stable on a regular or reliable basis. Thus, a fourth embodiment of the present invention, shown in FIG. 5, utilizes a random number generator 500 that adjusts the delay between the clock and the input to cause the meta-stable behavior more often.

Figure 5:
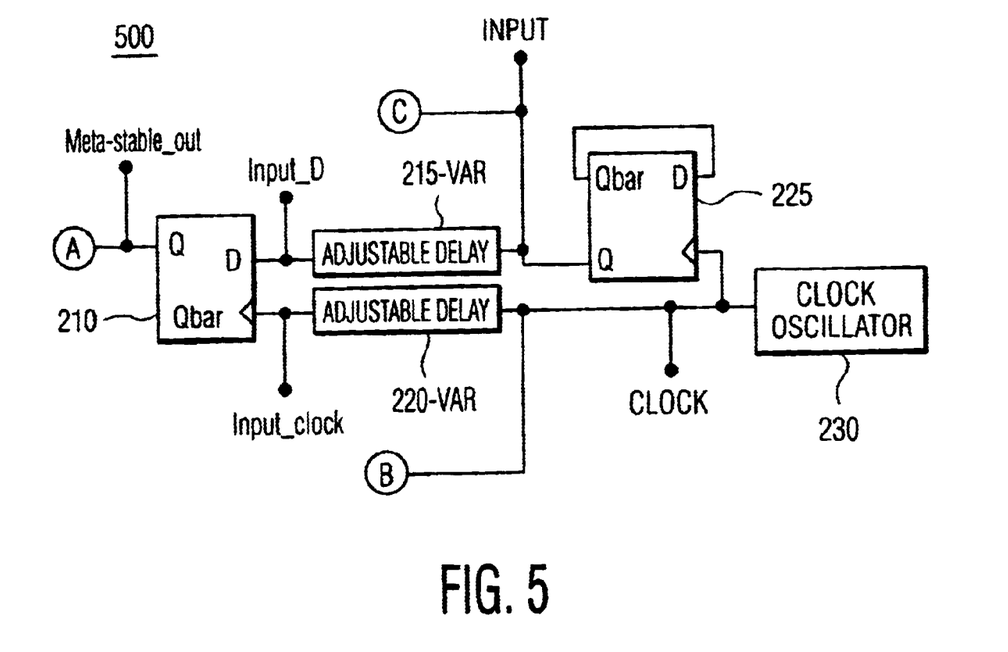
FIG. 5 illustrates a random number generator in accordance with a fourth embodiment of the present invention that adjusts the delay between the clock and the input to cause meta-stable behavior more often.

As shown in FIG. 5, the random number generator 500 includes a flip-flop 210, a D-type flip-flop 225 and a clock oscillator 230 that operate in the same manner as described above to in conjunction with FIG. 2A. In addition, the random number generator 500 includes variable delays 215-VAR, 220-VAR. These delays can be adjusted in real time to increase the number of mistakes and thus the productivity of the circuit.

Figure 6:
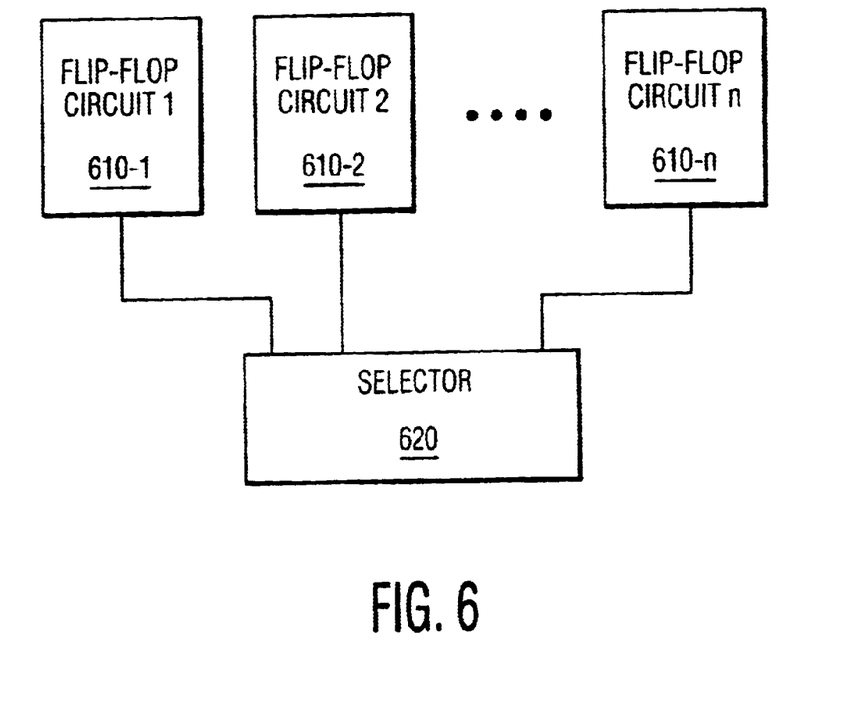
FIG. 6 illustrates a random number generator in accordance with a fifth embodiment of the present invention.

Similarly, a fifth embodiment of the present invention, shown in FIG. 6, accounts for process variations by utilizing multiple circuits 610-1 through 610-n with different flip-flops so that at least one of the n circuits will be meta-stable at a given time. The selector 620 can be implemented in hardware or in software. The selector 620, for example, can select the flip-flop circuit 610 producing the most bits (if bits are being generated, the circuit 610 is in a meta-stable state).

It is noted that the third embodiment of the present invention, wherein half of the zeroes are "marked" as "ones" and the other half are marked as "zeroes," serves to prevent a bias in the generated random bits. It is also noted that biases can also be removed by applying an exclusive or operation to adjacent bits, in a manner well-known in the art. For example, if an XOR gate is provided for every two bits, the result will be one bit. Thus, the output has fewer bits (lower yield), but a more uniform random number distribution (less bias).

The random number generators disclosed herein should be reset to a known state before use (and not a meta-stable state) In addition, a counter can be implemented in the random number generators of the present invention to detect when the shift registers are full. Thus, the counter should be incremented each time there is a shift. The counter can generate a processor interrupt to retrieve the generated bits.

It is to be understood that the embodiments and variations shown and described herein are merely illustrative of the principles of this invention and that various modifications may be implemented by those skilled in the art without departing from the scope and spirit of the invention.

What is claimed is:

1. A method for generating a random number, comprising the steps of:
 operating a flip-flop in a meta-stable state; and
 generating a random bit based on said meta-stable state when an output of said flip-flop does not match an applied input.

2. The method of claim 1, wherein said flip-flop is placed in said meta-stable state by violating a set-up time of said flip-flop.

3. The method of claim 1, wherein said flip-flop is placed in said meta-stable state by violating a hold time of said flip-flop.

4. The method of claim 1, wherein said flip-flop is constructed to be susceptible to becoming meta-stable.

5. The method of claim 1, wherein said generating step further comprises the step of setting a bit in a mistake signal if an output of said flip-flop does not match an applied input.

6. The method of claim 5, wherein the mistake signal causes a random bit to be acquired.

7. The method of claim 6, wherein a synchronizing circuit that performs said synchronizing step is less susceptible to becoming meta-stable than said flip-flip.

8. The method of claim 1, further comprising a step of synchronizing an output of said flip-flop with a local clock source.

9. The method of claim 1, further comprising a step of collecting a plurality of said random bits to produce a random number.

10. A method for generating a random number, comprising the steps of:
 marking an input signal to a flip-flop such that half of the zeroes are marked as zeroes and half of the zeroes are marked as ones;
 operating said flip-flop in a meta-stable state; and
 generating a random bit based on the meta-stable state.

11. The method of claim 10, wherein said flip-flop is placed in said meta-stable state by violating a set-up time of said flip-flop.

12. The method of claim 10, wherein said flip-flop is placed in said meta-stable state by violating a hold time of said flip-flop.

13. The method of claim 10, wherein said generating step further comprises the step of setting a bit in a mistake signal if an output of said flip-flop does not match an applied input.

14. The method of claim 13, wherein the mistake signal causes a random bit to acquired based on the marking input.

15. The method of claim 13, further comprising the step of synchronizing an output of said flip-flop with a local clock source.

16. The method of claim 13, further comprising the step of collecting a plurality of said random bits to produce a random number.

17. A method for generating a random number, comprising the steps of:
 marking an input signal to a flip-flop such that half of the ones are marked as zeroes and half of the ones are marked as ones;
 operating said flip-flop in a meta-stable state; and
 generating a random bit based on the meta-stable state.

18. A method for generating a random number, comprising the steps of:
 marking an input signal to a flip-flop such that half of the zeroes are marked as zeroes and half of the zeroes are marked as ones and half of the ones are marked as zeroes and half of the ones are marked as ones;
 operating said flip-flop in a meta-stable state; and
 generating a random bit based on the meta-stable state.

19. A method for generating a random number, comprising the steps of:
 applying a variable delay to an input of a flip-flop, said variable delay violating a set-up time of said flip-flop and thereby placing said flip-flop in a meta-stable state; and
 generating a random bit based on said meta-stable state.

20. The method of claim 19, wherein said generating step further comprises the step of setting a bit in a mistake signal if an output of said flip-flop does not match an applied input.

21. The method of claim 19, further comprising the step of synchronizing an output of said flip-flop with a local clock source.

22. A method for generating a random number, comprising the steps of:
 applying a variable delay to an input of a flip-flop, said variable delay violating a hold time of said flip-flop and thereby placing said flip-flop in a meta-stable state; and
 to generating a random bit based on said meta-stable state.

23. The method of claim 22, wherein said generating step further comprises the step of setting a bit in a mistake signal if an output of said flip-flop does not match an applied input.

24. The method of claim 22, further comprising the step of synchronizing an output of said flip-flop with a local clock source.

25. A method for generating a random number, comprising the steps of:
 operating a plurality of flip-flops in parallel, such that at least one of said flip-flop is in a meta-stable state; and
 generating a random bit based on said meta-stable state when an output of one of said flip-flops does not match an applied input.

26. A random number generator, comprising:
 a flip-flop operated in a meta-stable state to generate a random bit based on said meta-stable state when an output of said flip-flop does not match an applied input.

27. The random number generator of claim 26, wherein said flip-flop is placed in said meta-stable state by violating a set-up time of said flip-flop.

28. The random number generator of claim 26, wherein said flip-flop is placed in said meta-stable state by violating a hold time of said flip-flop.

29. The random number generator of claim 26, wherein a bit is set in a mistake signal if an output of said flip-flop does not match an applied input.

30. The random number generator of claim 26, further comprising a local clock source and synchronizing circuitry for synchronizing an output of said flip-flop with said local clock source.

31. The random number generator of claim 26, wherein a plurality of said random bits are collected to produce a random number.

32. A random number generator, comprising:
 a flip-flop operated in a meta-stable state;
 a marking circuit for marking an input signal to said flip-flop such that half of the zeroes are marked as zeroes and half of the zeroes are marked as ones; and
 means for generating a random bit based on the meta-stable state.

33. A random number generator, comprising:
 a flip-flop operated in a meta-stable state;
 a marking circuit for marking an input signal to said flip-flop such that half of the ones are marked as zeroes and half of the ones are marked as ones; and means for generating a random bit based on the meta-stable state.

34. A random number generator, comprising:

a flip-flop operated in a meta-stable state;

a marking circuit for marking an input signal to said flip-flop such that half of the zeroes are marked as zeroes and half of the zeroes are marked as ones and half of the ones are marked as zeroes and half of the ones are marked as ones; and means for generating a random bit based on the meta-stable state.

35. A random number generator, comprising:

a flip-flop; and a variable delay connected to at least one input of said flip-flop, said variable delay violating a set-up time of said flip-flop and thereby placing said flip-flop in a meta-stable state to generate a random bit based on said meta-stable state.

36. A random number generator, comprising:

a flip-flop; and a variable delay connected to at least one input of said flip-flop, said variable delay violating a hold time of said flip-flop and thereby placing said flip-flop in a meta-stable state to generate a random bit based on said meta-stable state.

37. A random number generator, comprising:

a plurality of flip-flops operated in parallel, such that at least one of said flip-flops is in a meta-stable state to generate a random bit based on said meta-stable state when an output of one of said flip-flops does not match an applied input.

* * * * *